Dec. 29, 1959   C. M. O'LEARY   2,918,830
DRIVE MECHANISM

Filed June 20, 1951   2 Sheets-Sheet 1

CHARLES M. O'LEARY,
INVENTOR.

BY

ATTORNEY

Dec. 29, 1959  C. M. O'LEARY  2,918,830
DRIVE MECHANISM
Filed June 20, 1951  2 Sheets-Sheet 2

CHARLES M. O'LEARY,
INVENTOR.

BY

ATTORNEY

United States Patent Office 2,918,830
Patented Dec. 29, 1959

2,918,830

DRIVE MECHANISM

Charles M. O'Leary, Los Angeles, Calif.

Application June 20, 1951, Serial No. 232,590

1 Claim. (Cl. 74—710.5)

The present invention relates to drive mechanisms for transmitting power from an engine to a pair of driven members, such as wheels, tracks or any other propulsion mechanisms.

It is valuable for use in tractors, military vehicles, off-highway trucks, trucks in general and similar vehicles and it is particularly useful in amphibious military vehicles.

It is an object of my present invention to obtain maximum maneuverability and control of the driven members of my drive.

Another object of my present invention is to provide a split power drive from a single source of power to two driven members and at the same time to provide separate speed and direction control of the said two driven members.

Another object of my present invention is to provide a single source of power driving into a power transfer mechanism having one power input shaft and two power output shafts and to provide control means to vary the speed of each of said two output shafts.

Another object of my present invention is to provide a single source of power and to split this power into two separate power paths, the speed and torque of each power path being controllable and each power path driving to a separate hydraulic drive which is subject to and controlled by the speed of its input member. This, in turn, determines its output power capacity which varies with the input speed to said hydraulic drive.

Another object of my present invention is to provide a single source of power with means to split said single source of power into two separate paths and to provide means to control the speed of each of said two separate power paths with a hydraulic drive in each of said separate power paths. The power output of each of said hydraulic drives is controllable by the input speed to each of said hydraulic drives and also there is a geared transmission between each of said hydraulic drives and its said respective driven member. These hydraulic drives provide a cushion between the input speed control mechanism and said driven members in such a manner that either of said power paths may be controlled independently of the other.

Another object of my present invention is to provide in a drive having a single source of power leading into two power paths means to vary either of those power paths in relation to the other by having each of those power paths drive a hydraulic torque converter or fluid coupler. In my present drive the output members of each of my fluid drive units drives an independent geared transmission which drives a driven member. These means in my power paths permit either of my geared transmissions and the output member of its respective fluid drive unit to be driven in reverse, even though both of my geared transmissions are in one of their forward gears, by the relative backward movement of its driven member caused by the excessive turning force of the other power path, without affecting the other power paths or the engine speed.

Another object of my present invention is to provide in a drive having a single source of power, a speed control mechanism that can split that power into two fluid drive equipped power paths and to control the speed and power delivered to each of said power paths to any desired degree.

A clutch equipped drive connection between the output members of each of my fluid drive units causes the output members of my fluid drive units to turn in unison when the clutch is engaged. This will cause equal power to be delivered through each of the separate power paths to the separate final driven members.

When the clutch is disengaged, on the other hand, the output shafts of my fluid drive units will be driven at different speeds, depending on the separate torque loads imposed upon each of them by their respective final driven members. These torque loads are transmitted back from the final driven members through their respective geared transmissions to the output members of their respective fluid drive units.

Other objects and advantages of my invention will be apparent from the following description and claim, the novelty consisting in the features of construction, combination of parts, the unique relations of the members and the relative proportioning, disposition and operation thereof, all as is more completely outlined herein and as is particularly pointed out in the appended claim.

In the accompanying drawings, forming a part of this present specification,

Figure 1:
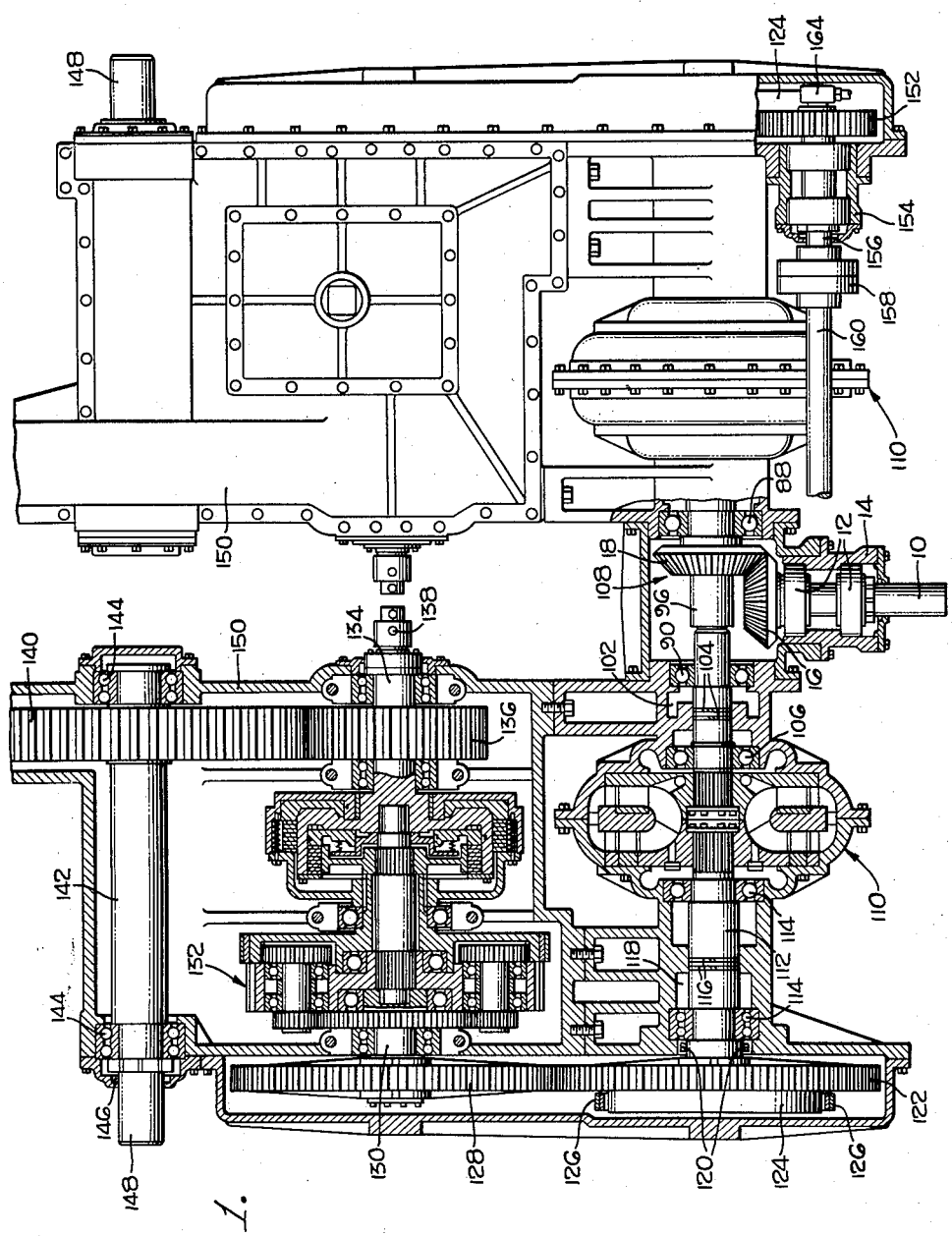
Figure 1 is a plan view, partly in section, of one form of my drive mechanism.

Referring to the drawings, an input drive shaft 10, journaled in the bearings 12 of a bearing cartridge 14 may be operatively connected to an engine or other source of power.

An input pinion gear 16 mounted on shaft 10 will transmit this power to a ring gear 18 in the conventional manner.

The mechanisms on opposite sides of ring gear 18 in Figure 1 are identical except those on one side are shown in section and those on the opposite side are shown in perspective with cover plates in operative position.

Hence, it will be understood that all descriptions hereinafter and all numbering on the sectional side of Figure 1 will apply equally to the opposite side of Figure 1 shown in perspective. In other words in the preferred embodiment of my invention shown in Figure 1 the mechanisms on opposite sides of ring gear 18 are provided in identical pairs forming separate identical power trains from ring gear 18 to the separate output members of my drive mechanism.

Figure 2:
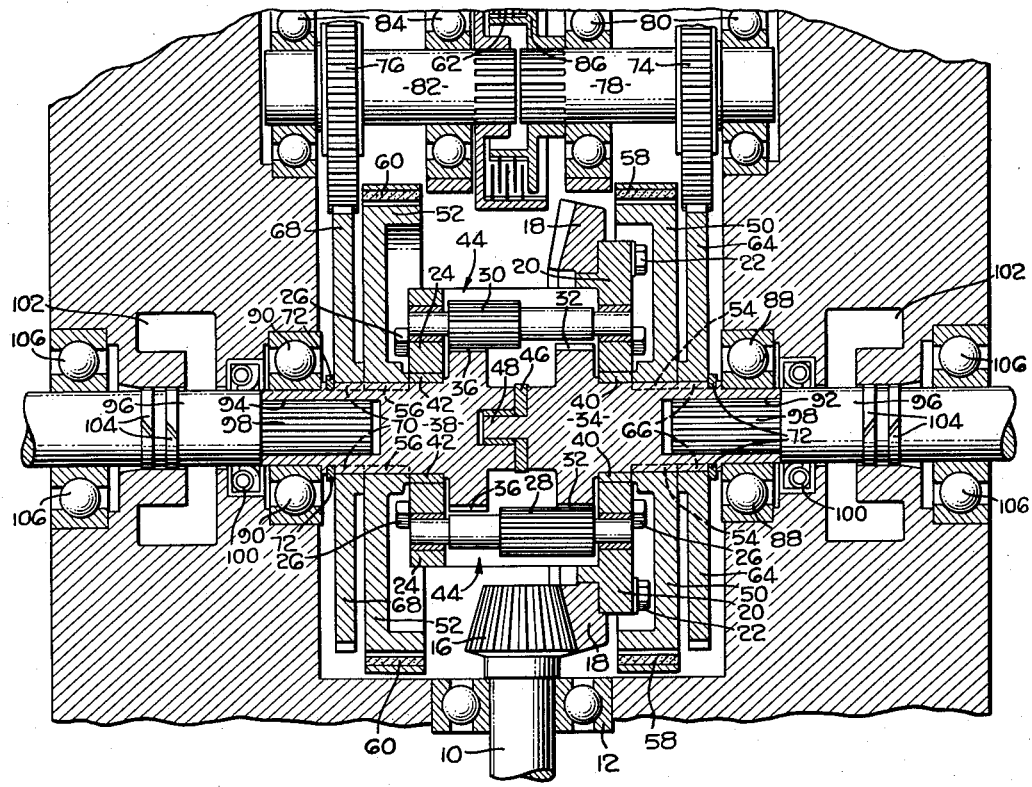
Figure 2 is a sectional plan view of my preferred embodiment of an input drive connection between the engine and the converters or fluid drive transmissions.

From the ring gear 18 this power may be further transmitted through my drive mechanism by the angle drive shown in Figure 1 or, alternatively, by my preferred embodiment, shown in Figure 2, constituting a differential drive, which I will now describe.

The differential shown in Figure 2 is my preferred embodiment among the well known approved prior art tractor drive differentials. It was shown to exemplify any of the many prior art differentials which will best bring out the advantages of my present invention.

Ring gear 18 is integrally connected to side plate 20 (see Figure 2), which constitutes the right hand side of a differential cage, by bolts 22 or other suitable means. Side plate 24, which constitutes the left hand side of a differential cage, is in turn connected to side plate 20 by bolts 26.

Right hand planet gears 28 and left hand planet gears 30 are mounted between side plates 20 and 24 so as to cause adjoining pairs of gears 28 and 30 to mesh with each other in the well known usual manner.

A right hand differential output gear 32 is mounted on right hand differential output shaft 34 and it meshes with right hand planet gear 28. Similarly, left hand differential output gear 36 is mounted on left hand differential output shaft 38 and it meshes with left hand planet gear 30.

Right hand planet cage bearing 40 and left hand planet cage bearing 42 serve to journal planet differential cage 44 on shafts 34 and 38.

Thrust bearing 46 is provided between shafts 34 and 38 and a pilot shaft 48 may be provided on the end of shaft 34.

By these means power from input shaft 10 may be transmitted to shafts 34 and 38, which can turn in unison or independently of each other at different speeds, depending on the clutch position.

Right hand output shaft brake drum 50 is connected to right hand differential output shaft 34 and left hand output shaft brake drum 52 is connected to left hand differential output shaft 38. Right hand splines 54 connect shaft 34 and drum 50 and left hand splines 56 connect shaft 38 and drum 52. Right hand differenial brake band 58 acts on right hand drum 50 and left hand differential brake band 60 similarly acts on durm 52. In this manner either or both differential output shafts 34 or 38 may be braked together or separately.

A differential equalizer drive or lock 62 may be provided as shown in Figure 2 of my drawings or may be omitted from the assembly if desired.

This differential equalizer drive will now be described. A right hand equalizer gear 64 is keyed or splined to shaft 34 by splines 66 and a left hand equalizer gear 68 is similarly keyed or splined to shaft 38 by spline 70. Suitable snap rings 72 hold gears 64 and 68 and drums 50 and 52 in place.

Right hand equalizer pinion gear 74 meshes with and is driven by right hand equalizer gear 64 and left hand equalizer pinion gear 76 meshes with and is driven by left hand equalizer gear 68.

Gear 74 in turn is mounted on right hand equalizer shaft 78 which is journaled in bearings 80 and left hand equalizer shaft 82 supports gear 76 and is journaled in bearings 84.

Equalizer shafts 78 and 82 are connected by clutch 86 which completes my differential equalizer drive or lock assembly 62.

Returning to the description of my differential drive mechanism, my right hand differential output shaft 34 is journaled in bearings 88 and my left hand differential output shaft 38 is journaled in bearings 90. Shaft 34 has internal splines 92 and shaft 38 has similar internal splines 94, which engage the respective input shafts 96 of my torque converters by means of external splines 98 on shafts 96.

It is to be noted that, though separate numbers are given to both sides of my differential drive and differential equalizer drive or lock mechanisms, a single number, 96, is given to both input shafts of my two converters in order to carry over from Figure 2, to Figure 1, where only one side, the side shown in section, is given numbers. From number 96 upward in Figure 2 the same number is applied to similar parts of both sides of the drawing.

Integral connection between input shafts 96 of the two converters and differential output shafts 34 and 38 is effected through external splines 98 on shafts 96 which mesh with internal splines 92 and 94 in shafts 34 and 38, respectively.

Oil seals 100 on shafts 96 separate the differential lubricating oil from the torque converter operating oil. Torque converter leakage sumps 102 are provided and drains to a reservoir, not shown, carry off the leakage which deposits in sumps 102.

Torque converter oil seal rings 104 on shaft 96 hold the oil in the torque converters. Shafts 96 are journaled in bearings 106 which complete the assembly of the preferred embodiment of my differential drive, shown in Figure 2 of the drawings.

An alternative simple angle drive 108, shown in Figure 1 of the drawings, is effected by gears 16 and 18 and shafts 10 and 96 which constitute the alternative angle drive, the operation of which is explained hereinafter.

The angle drive shown in Figure 1 has a fixed input speed into both hydrokinetic torque converters 110. This input speed may be altered only by altering the engine speed. The control of the two separate drive members may be accomplished by the application of brakes 126 on the output shafts 112 of the converters 110. One brake may be applied to such an extent that the power train on that side may be completely stopped or both torque converter output shafts 112 may be completely stopped without affecting the engine or the engine speed.

When the output shaft 112 of either torque converter 110 is slowed down by such braking action the loss in delivered power is converted into heat in the torque converter operating fluid. This heat can be dissipated by my automatic cooling system, shown in my co-pending patent application, Serial Number 666,626, filed May 2, 1946, which will maintain the torque converter operating fluid at a constant temperature under any and all conditions of operation.

In Figure 1 of the drawings, shaft 96, extending either from the differential drive mechanism shown in Figure 2, or from angle drive 108, shown in Figure 1, constitutes the input shaft of a hydrokinetic fluid drive transmission, such as a hydrokinetic torque converter 110, which is well known in the art and hence is not described in detail herein, my preferred embodiment, or any other type of fluid drive transmission, such as a fluid coupler, not shown which operates in the usual manner.

Torque converter 110 may be any one of a number of satisfactory fluid drives, torque converters or fluid couplers that are well known in the art, both as to design and performance characteristics, and that will perform the part of the work of my present invention described herein with relation to torque converter 110.

An output shaft 112 from converter 110 is journaled in bearings 114. Oil seals 116 isolate the torque converter fluid from the transmission oil.

A converter leakage oil sump 118 drains to a reservoir, not shown, in a manner similar to sump 102 and oil seals 120 function like oil seals 100.

An output gear 122 of converter 110 is mounted on converter output shaft 112 and a brake drum 124 is integrally mounted on gear 122. Brake bands 126 act on drums 124 and, through the above integral train of mechanism, on converter output shaft 112.

Gear 122 meshes in operative engagement with a gear transmission input gear 128 which is integrally mounted on input shaft 130 of gear transmission 132. Any suitable gear transmission may be used but my preferred embodiment, shown in Figure 1, is a gear transmission having two speeds forward and one speed reverse that is shown and claimed in my co-pending application for United States Letters Patent Serial Number 54,983, filed October 16, 1948, now Patent No. 2,555,454.

It is not intended to claim any particular form of gear transmission as part of my present invention. The transmission 132 referred to herein may be any form of planetary gear transmission, as long as it satisfactorily performs the functions referred to herein for gear transmission 132.

An output shaft 134 for transmission 132 is provided with an output gear 136 and an oil input 138 to actuate the clutches which shift the gears in transmission 132 in the manner described in my above application Serial Number 54,983, filed October 16, 1948, now Patent No. 2,555,454.

An output bull gear 140 meshes with and is driven by gear 136.

Drive shaft 142 is journaled in bearings 144 and carries bull gear 140. Oil seals 146 are provided on the outside of shaft 142.

The end 148 of shaft 142, which acts as a final output member of my drive may be splined or keyed to receive the member to be driven.

The usual case assembly 150 covers all movable parts.

My equalizer drive assembly, shown in Figure 3 and indicated in Figure 1, will now be described.

A pinion gear 152 meshes with and is driven by gear 122, the output gear of torque converter 110. A bearing cartridge 154 supports an equalizer drive shaft 156 which is journaled in cartridge 154 and a flexible coupler 158 is provided between shaft 156 and shaft 160, the two shafts 156 and 160 being joined together by coupler 158.

A clutch 162 connects both shafts 160 in the usual manner and this clutch 162 is actuated by oil from oil input 164 and oil duct 166 which carries the oil from input 164 to the interior of clutch 162 along the inside of shafts 156 and 160.

This completes the description of the parts of my invention and I will now describe the preferred mode of operation of my preferred embodiment shown in the drawings of this application.

Figure 3:
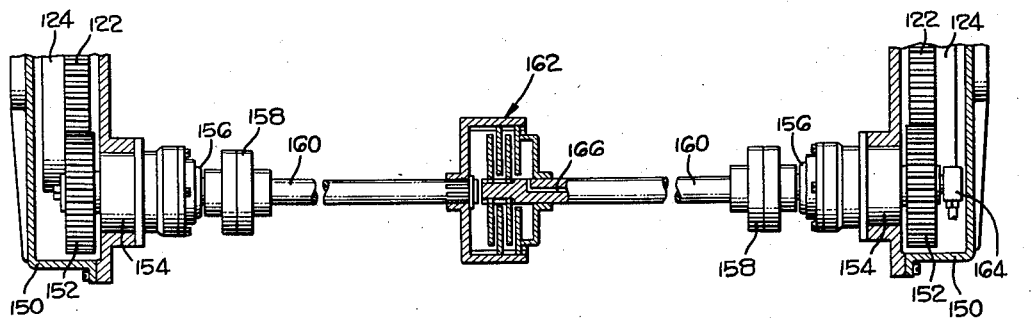
Figure 3 is a plan view, partly in section, of my equalizer drive.

In normal straight forward motion of a vehicle equipped with the preferred embodiment of my drive mechanism clutch 162 of my equalizer drive is engaged, thus connecting the output shafts 112 of my two torque converters 110 by means of my equalizer drive mechanism shown in Figure 3 hereof. This equalizes the output speed of both torque converters and prevents the vehicle from drifting to one side or the other.

Also during normal straight forward motion of the vehicle clutch 86 of differential equalizer drive or lock 62 is engaged, thus locking the differential so that its two output member 96 turn at the same speed.

When either of the steering brakes, 58 or 60, is applied clutch 86 of differential equalizer drive 62 is automatically disengaged, thus permitting control of the speed of either or both differential output shafts 34 and 38 by the application of brake bands 58 or 60.

The characteristic of the differential is such that if either differential output member, 34 or 38 is slowed down by braking action clutch 86 being automatically thereby disengaged, the other differential output member will gain in speed the amount of speed that is lost by the braked differential output member as a result of that braking action.

As any application of brakes 58 or 60 also automatically disengages clutch 162 of my equalizer drive (Figure 3) between the output members 112 of my torque converters 110, any gain in speed by either differential output member, 34 or 38, due to any braking action by application of brakes 58 or 60 will be transmitted through the entire power train from member 34 or 38 to final output member 148, including converter 110, transmission 132 and their connecting mechanisms.

In this way the simple application of brakes 58 or 60 will cause one final output member 148 and its attached wheel, propeller, tractor tread, or the like to move at a slower speed than the other member 148 or even come to a complete stop.

Similarly the gears of one transmission 132 may be independently shifted by fluid oil input 138 to actuate the clutches of transmission 132 and in this way one transmission 132 may be placed in high gear forward and the other transmission 132 placed in low gear forward or reverse, thus causing the two final drives 148 to move at different rates or even in different directions.

Also, when the vehicle is going full speed forward, both transmissions 132 may be shifted into reverse without any excessive strains or stresses in the power train. In my present invention when transmissions 132 are both placed in reverse, the forward motion of the vehicle drives the output shaft of the converters 110 backwards which causes the torque converter to act as a brake and absorbs the kinetic energy of the vehicle. This brings it quickly and smoothly to a stop and then reverses the direction of movement of the vehicle. This is shown in my co-pending application, Serial No. 740,673, filed April 10, 1947.

Another advantage of this drive is that, when clutches 162 and 86 are disengaged and either of brakes 58 or 60 is applied to maneuver the vehicles, the inside track or wheel of the vehicle is free to turn at its own independent speed and it may even be driven backward by the turning force exerted by the vehicle. This is quite advantageous in making tight turns.

Under well known principles any differences in speed or direction of rotation of final drives 148 will cause a corresponding turning action of the vehicle.

Thus, to put it simply, a vehicle equipped with my invention may be turned by merely applying one of brakes 58 or 60, or by shifting the gears of one of the transmissions 132. Naturally, different speeds and types of turning are thus effected, thereby offering a wider range of choice to the operator to fit his driving conditions and desires.

Brakes 126 on output shafts 112 of converters 110 may be used as parking brakes or to augment steering and provide still further alternative variations to the driver.

Automatic shifting of the gears of transmission 132 as described and claimed in my co-pending application for United States Letters Patent, Serial No. 647,677, filed February 15, 1946, and my United States Letters Patent, Serial No. 2,529,129, may be provided to maintain the torque converters loaded and operating at maximum delivered efficiency and horsepower.

Also automatic cooling of the transmission and differential lubricating oil, as when the converters are used as a brake, as described in my co-pending application for United States Letters Patent, Serial No. 666,626, filed May 2, 1946, may be provided.

One advantage of my drive is that by applying the brakes 58 or 60 to one side or the other the input speed of the two converters 110 is varied and thereby the output torque as well as the output speed is varied without loss of any substantial amount of power.

While I have shown the preferred form of my invention, it is to be understood that various changes may be made in its construction by those skilled in the art without departing from the spirit of the invention as defined in the appended claim.

I claim:

A drive mechanism including a differential member having a plurality of differential output members, a braking mechanism on each of said differential output members, a hydrokinetic torque converter operatively connected to each of said differential output members, each of said torque converters having an output member, a differential output member equalizer including a clutch mechanism and a drive connection between said clutch mechanism and each of said differential output members, and a torque converter output member equalizer including a second clutch mechanism and a drive connection between said second clutch mechanism and each of said torque converter output members.

(References on following page)

References Cited in the file of this patent

UNITED STATES PATENTS

| | | | |
|---|---|---|---|
| 1,119,284 | Holterman | Dec. 1, | 1914 |
| 1,128,064 | Senderling | Feb. 9, | 1915 |
| 1,387,208 | Storey | Aug. 9, | 1921 |
| 1,758,806 | Saives | May 13, | 1930 |
| 1,872,541 | White | Aug. 16, | 1932 |
| 1,938,457 | McCaffery | Dec. 5, | 1933 |
| 2,126,255 | Hacker | Aug. 9, | 1938 |
| 2,376,699 | Jandasek | May 22, | 1945 |
| 2,378,082 | Hood | June 12, | 1945 |
| 2,393,557 | Orshansky | Jan. 22, | 1946 |
| 2,441,703 | Irwin | May 18, | 1948 |
| 2,525,766 | Kelley | Sept. 26, | 1950 |
| 2,533,611 | Norelius | Dec. 12, | 1950 |